United States Patent [19]

Ehrentraut et al.

[11] Patent Number: 4,587,883
[45] Date of Patent: May 13, 1986

[54] HIGH RESOLUTION CONTROL SYSTEM FOR A PRESSURE-RESPONSIVE POSITIONING DEVICE

[75] Inventors: Franz-Josef Ehrentraut, Monchen-Gladbach; Manfred Henning, Kaarst, both of Fed. Rep. of Germany

[73] Assignees: Robert Bosch GmbH, Stuttgart; Pierburg GmbH & Co. KG, Neuss, both of Fed. Rep. of Germany

[21] Appl. No.: 701,799

[22] Filed: Feb. 15, 1985

Related U.S. Application Data

[63] Continuation of Ser. No. 422,382, Sep. 24, 1982, abandoned.

[30] Foreign Application Priority Data

Oct. 10, 1981 [DE] Fed. Rep. of Germany ....... 3140301

[51] Int. Cl.$^4$ .................... F15B 9/03; F15B 13/16
[52] U.S. Cl. ............................. 91/363 R; 91/361; 318/632
[58] Field of Search ............ 91/367, 363 R, 361; 318/632; 364/183; 137/14

[56] References Cited

U.S. PATENT DOCUMENTS

| | | | |
|---|---|---|---|
| 3,421,318 | 1/1969 | Falk | 91/361 |
| 3,555,254 | 1/1971 | Gerber | 318/632 |
| 3,586,951 | 6/1971 | Inaba et al. | 318/632 |
| 3,664,234 | 5/1972 | Simons et al. | 91/367 |
| 3,664,358 | 5/1972 | Kosugi et al. | 137/14 |
| 3,727,517 | 4/1973 | Slavin et al. | 91/361 |
| 3,852,719 | 12/1974 | Nishumura et al. | 318/632 |
| 3,885,644 | 5/1975 | Seidler et al. | 180/176 |
| 4,074,177 | 2/1978 | Olig | 318/632 |
| 4,286,318 | 8/1981 | Immink et al. | 364/183 |
| 4,294,162 | 10/1981 | Fowler et al. | 91/361 |

FOREIGN PATENT DOCUMENTS

| | | | |
|---|---|---|---|
| 2275817 | 1/1976 | France | |
| 0153410 | 11/1981 | Japan | 318/632 |
| 0652530 | 3/1979 | U.S.S.R. | 91/361 |

*Primary Examiner*—Sheldon J. Richter
*Assistant Examiner*—Randolph A. Smith
*Attorney, Agent, or Firm*—Frishauf, Holtz, Goodman & Woodward

[57] ABSTRACT

Two magnetic valves, one of which reduces the pressure and the other one of which increases the pressure by which the displacement of a positioning member is controlled, only one of them operated at a time in accordance to the sign of the error signal, are operated in a pulsed mode with variable pulse width when the error signal is within a range of low absolute value and in a continuous mode of operation when the error signal has a higher absolute value. Variation of the magnitude of the error signal within the intermittent valve operation range controls pulse width variation. Hysteresis is provided in a transition between operating modes of a valve by a time delay of the mode change after the error signal has risen or fallen past a threshold value of signal. High displacement resolution is obtained as well as independence from effect of temperature drifts and magnetic valve characteristics.

4 Claims, 4 Drawing Figures

HIGH RESOLUTION CONTROL SYSTEM FOR A PRESSURE-RESPONSIVE POSITIONING DEVICE

This application is a continuation of application Ser. No. 422,382, filed Sept. 24, 1982, now abandoned.

The invention concerns a control system for a pressure responsive device of the kind that is operable by a magnetic valve that serves to produce a mechanical displacement in response to the error signal of a servo system, either for following mechanically a variable electrical desired-position signal or for responding to electrical commands for a change from one mechanical position to another. Magnetic valves are used to control pneumatically or hydraulically operated devices for mechanical positioning in a variety of systems utilized in modern motor vehicles, for instance.

A control system for a pressure responsive device utilizing magnetically operable valves is known from U.S. Pat. No. 3,885,644, in which, however, the two magnetic valves utilized for controlling the positioning member of a pressure-responsive device provide control by either opening fully or closing fully until the error signal calls for return to the opposite condition. This has the disadvantage of poor displacement resolution and occasionally leads to "hunting" oscillations in reaching a desired position setting.

THE INVENTION

It is an object of the present invention to provide a control system in which magnetically operable valves control a pressure-responsive positioning device with a higher degree of positioning resolution than has heretofore been available and with freedom from hunting, preferably by introducing some gradation in the operation of the magnetic valve.

Briefly, the system provides electrical circuits defining thresholds of absolute value of error signal (i.e. of magnitude both in positive and negative values of error signal) to define a range of lowest value in which a valve is not operated at all, a range of highest value in which a valve is fully operated and a range of intermediate value in which a valve is intermittently operated, means being provided to supply pulses for intermittent operation, preferably with variation of pulse width or duty cycle (keying ratio) as a function of error signal magnitude. Typically one valve responds to error signals of one polarity and another valve responds to error signals of the other polarity.

The control system of the invention has the advantage that a high displacement resolution can be obtained by variation of the positioning force in the aforesaid intermediate range of error signal absolute magnitude. In consequence the control system can be constructed in a manner highly independent of the physical and electrical dimensions of the magnetic valve or its operating characteristics with freedom from effects of temperature drifts to which the valve may be subject. Hunting oscillations are also eliminated. It is particularly useful to make provision for hysteresis in the transitions between the valve operating modes corresponding to the aforesaid ranges of error signal absolute magnitude, for example by providing a time delay in the operating mode change after the error signal crosses a magnitude range boundary.

Further details, particularly regarding the manner in which intermittent operation is varied over its range of error signal value, are given in the detailed description that follows.

THE DRAWING

The invention is further described by way of illustrative example with reference to the annexed drawing, in which.

DESCRIPTION OF THE ILLUSTRATED EMBODIMENT

Figure 1:
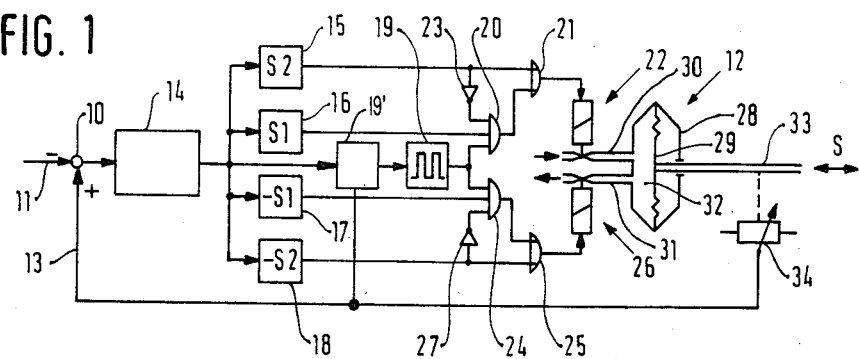
FIG. 1 is a circuit block diagram of an embodiment of a control system in accordance with the invention.

FIG. 1 shows a point of comparison 10 of a control loop to which a desired value for the positioning by the device 12 of some object or component (not shown in the drawing) at the end of the rod or tube 33 is provided as an electrical signal over the line 11 while an actual value of the position of the rod 33 and hence of the object to be positioned is provided by a displacement transducer 34 to the comparison point 10 over the line 13. The error signal resulting from the comparison is supplied through a controller 14 to the inputs of four threshold value stages 15, 16, 17 and 18 as well as to one input of the control circuit 19' a variable pulse generator 19.

The output of the threshold stage 16, which produces an output signal when a threshold value S1 is exceeded, is connected, through an AND-gate 20 and a following OR-gate 21, with a magnetic valve 22 of the positioning member 12 for controlling the pressure medium supplied. The output of the threshold stage 15, which produces an output signal when a threshold value S2 is exceeded, is connected with another input of the OR-gate 21 as well as over an inverter 23 with another input of the AND-gate 20. The output of the threshold stage 17, that produces an output signal when the error signal goes below a negative threshold value $-S1$ is connected, through another AND-gate 24 and following OR-gate 25, with another magnetic valve 26 for control of pressure reduction in the positioning member 12. The output of the threshold stage 18 that produces an output signal when the error signal goes below a negative threshold value $-S2$ is connected with another input of the OR-gate 25 as well as, through an inverter 27, to another input of the AND-gate 24. The output of the signal generator 19 is connected respectively to additional inputs of the AND-gate 20, 24. The casing 28 of the positioning member 12 is subdivided by a membrane 29 which forms a pressure chamber 32 together with the casing wall, in which are located the pressure medium supply and pressure medium removal lines 30 and 31. The positioning rod 33, which may operate as a lever rather than merely as a pushing and pulling member, is affixed to the membrane 29 for converting the positioning commands into movements of some object, component or device not shown in the drawing. The actual position transducer 34 is in this case a potentiometer that provides a signal over the line 13.

The pressure medium removal line 31 is preferably connected with an evacuation system, while the pressure medium supply line 30, in this illustrated pneumatic case, is connected to the outside (atmospheric) air pressure. Of course it would also be possible to connect the pressure supply line 30 to a source of compressed air and the pressure removal line 31 to the outside air. It would also be possible to provide two different pressure sources or two different evacuation systems for providing a pressure difference. Other pneumatic or hydraulic positioning members that have pressure supply and pressure removal lines could likewise be used in an analagous manner in the system here shown.

Figure 2:
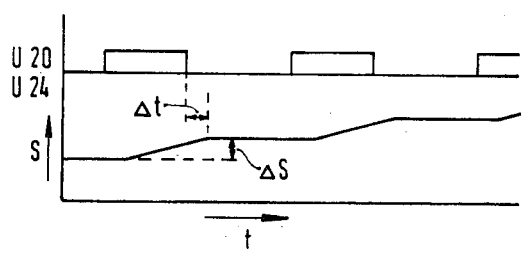
FIG. 2 is a signal diagram for illustrating the manner of operation of the circuit in the intermittent valve operation mode.

The manner of operation of the embodiment illustrated in FIG. 1 is that first the actual value signal is compared with the desired value signal at the comparison point 10 and the difference, which is the error signal, is supplied to the controller 14. The latter generates at its output in any known way a modified error signal better suited than the original error signal for bringing the actual position value to the desired position value. The controller 14 can be a simple amplifier. If the modified error signal is small, none of the four threshold value stages 15 . . . 18 respond, and both magnetic valves 22 and 26 remain closed. With increasing error signals in one direction or the other, the threshold S1 or the threshold $-$S1 will be respectively exceeded or undershot and one of the threshold stages 16 and 17 produces an output signal by which the AND-gate 20 or the AND-gate 24, as the case may be, is opened for passage of the output signal of the signal generator 19, designated U20 and U24 respectively. The signal train U20 or U24 intermittently actuates the magnetic valve 22 or the magnetic valve 26, as the case may be. The actual position S is then modified according to FIG. 2, in steps of ramp form in the direction of the desired position valve. By each individual signal of the train U20 or of the signal train U24 an actual valve change of $\Delta S$ is produced. As the result of the inertia of the system the modification of the actual value signals relative to the positioning signals proceeds with some delay relative to the latter and likewise ends delayed by the value $\Delta t$. In the simplest case a positioning signal train of fixed keying ratio (duty cycle) can be selected. It is more advantageous, however, to modify the keying ratio or the pulse width of this positioning signal train as a function of the magnitude of the error signal. This means that with greater error signal the signal duration is longer than is the case for smaller error signals. This can lead to an improvement of the control characteristic.

If the error signal increases still more, then, according to the direction of deviation (sign of the error signal) the threshold value S2 or the threshold $-$S2 will be reached and one of the threshold values 15 and 18 will produce an output signal. Then on the one hand the AND-gate 20 or the AND-gate 24 will be blocked by operation through the inverter 23 or the inverter 27, as the case may be, and on the other hand the magnetic valve 22 or the magnetic valve 26 will be continuously actuated through the OR-gate 21 or the OR-gate 25 as the case may be. In this manner the greatest possible positioning force and therefore the highest possible displacement rate in the direction of the desired position value is provided. If as the result of this displacement the error signal goes down below the threshold S2 or above the threshold $-$S2 again, intermittent operation sets in again to reduce the positioning force and the displacement velocity.

Figure 3:
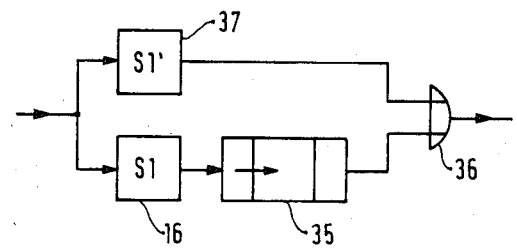
FIG. 3 is a circuit block diagram illustrating details of the means 19' of FIG. 1 for controlling the means for providing hysteresis in a valve operating mode transition for a system of the general type of FIG. 1.

The circuit illustrated in FIG. 3 is designed to illustrate a hysteresis type of transition between operating regions of a magnetic valve by taking as an example the case of the threshold value S1 of FIG. 1. What is involved in this illustration is the transition from the dead zone into the intermittent operation region and vice versa. The same principle is also naturally applicable to the transition of the intermittent operation range into the continuous operation range.

The threshold value stage 16 in FIG. 3 is followed by a time delay circuit 35 for delaying the 0-1 signal transition. The delay circuit 35 provides its output to an input of an OR-gate 36. Another threshold value stage 37 activated in parallel with the threshold value stage 16 and having a threshold value S1' that is raised somewhat above the threshold value S1 has its output connected to another input of the OR-gate 36, the output of which is in turn connected to the AND-gate 20. The manner of operation of the embodiment of FIG. 3 is that when the error signal drops below the threshold value S1' at first there is no effect of the output signal of the controller 14. The intermittent operation of the magnetic value 12 is continued. Only when the threshold value S1 is undershot does the OR-gate 36 block, so that the dead zone is reached in which both of the magnetic valves 22 and 26 are closed. If now the error signal briefly oversteps the threshold valve S1 again, no change is produced so long as this brief overstepping of the threshold is shorter than the delay time of the delay circuit 35. Only when the threshold value S1 is overstepped for more than the delay time of the circuit 35 is the intermittent operation of the magnetic valve 22 resumed. In each case however, it begins only after the threshold value S1' is overstepped. Thus, undershooting of the threshold value S1' and brief overshooting of the threshold value S1 remain without effect on the operating behavior of the magnetic valve 22. Instead of a time delay circuit 35 for delaying the 0 to 1 signal transmission, similar operation can be provided by delaying the 0 to 1 signal transition with or without also delaying the 1 to 0 signal transition.

Figure 4:
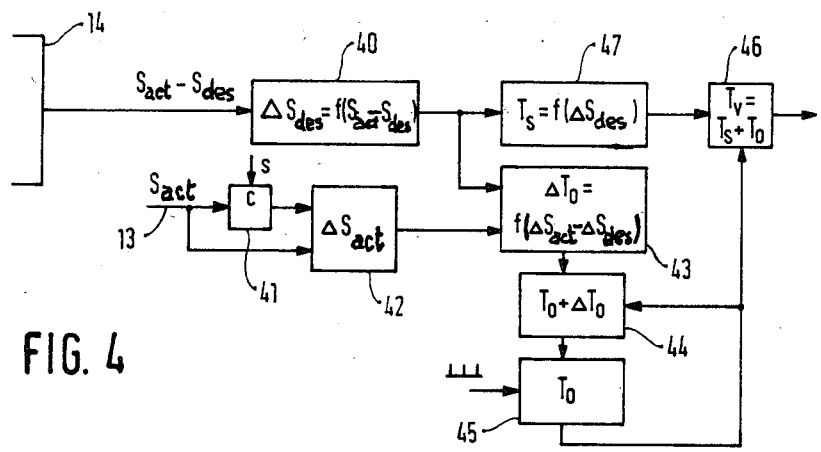
FIG. 4 is a circuit block diagram illustrating generation of pulses of variable pulse width for intermittent operation of a valve in the system of FIG. 1.

FIG. 4 shows the control circuit 19' of FIG. 1 for varying the pulse width and keying ratio of the pulse generator 19 for generation of positioning signals U20 and U24 for producing intermittent operation either of the valve 22 or of the valve 26. For this purpose the output signal of the controller 14, which is typically proportional to the error signal (actual minus desired position) is supplied first to a function generator 40. In the latter a desired signal increment $\Delta S_{des}$ is formed as a function of the input magnitude. The actual position signal $S_{act}$ on the line 13 is provided on the one hand to a storage unit 41 and on the other to a difference forming stage 42. With every leading edge of a signal U20 or U24, the actual position signal that is present is put into the storage unit 41 and the value thus stored is subtracted from the current value of the varying actual value signal. The result is the actual value increment $\Delta S_{act}$ that designates how strongly the actual value has been changed as a consequence of a signal of the train U20 or of the train U24.

In the function generator 43 a correction value $\Delta To$ is formed as a function of the difference between the actual value increment and the desired value increment ($\Delta S_{act}$ minus $\Delta S_{des}$). In the addition stage 44 that follows the correction value $\Delta To$ is added to a stored base value To for the valve turn-on time Tv. The result is stored as the new base value To in the following storage unit 45, which also has a clock pulse input shown at the left. The storing operations take place in the rhythm of the signal train U20 or U24, as the case may be, in each case shortly before the beginning of the signal. The pulse train necessary for storage timing can be additionally produced by the signal generator 19 of FIG. 1 or derived from its output. The new base value To is then added to a further correction value Ts in the addition stage 46, Ts being generated in a function generator 47 as a function of the desired value increment $\Delta S_{des}$. The valve actuation period Tv thus obtained is then supplied to the signal generator 19 for controlling the duration of the positioning signals. In this manner an optimum displacement resolution is obtained with avoidance of regulation oscillations and with a high degree of independence of valve parameters and operating characteristics and of temperature drifts.

The correction value $\Delta T_o$ can advantageously be formed independently for each magnetic valve 22 and 26. A seperate value To is then provided for the evacuating valve and for the ventilating (aeration) valve. The control algorithm represented by the circuit of FIG. 4 is thus made available for each of the two valves in turn. Shortly before the beginning of the signal train U20 or U24 the correction value To is corrected for the valve which in the preceding interval was operated with a pulse. The correction is made after every provision of a pulse, even when in the next interval no pulse is to be provided. It is to be understood that in simpler embodiments a smaller number of influencing magnitudes or combinations thereof can be used for deriving the valve actuation period Tv. The functions formed can likewise provide as linear functions in simpler embodiments and as nonlinear functions in more comfortable embodiments. Thus, for example, the desired value increment $\Delta S_{des}$ can be a constant.

It will accordingly be seen that although the invention has been described with reference to particular illustrative embodiments, variations and modifications are possible within the inventive concept.

We claim:

1. Control system for the position of a pressure-controlled displaceable element (12) of a positioning device, said system comprising a first magnetically operable valve (22) connected between a first pressure source and said element for displacing said element in a first positioning direction and a second magnetically operable valve (26) connected between a seocnd pressure source and said element for displacing said element in a second positioning direction opposed to said first direction, means for generating an error signal ($S_{act} - S_{des}$) for directing displacement of said displaceable element towards a desired position thereof, said error signal being positive for directing displacement in said first positioning direction and negative for directing displacement in said second positioning direction, means for operating one or the other of said magnetic valves as determined by the sign of said error signal, means for producing intermittent operation of only said first magnetic valve in a first range of positive value of said error signal and for producing intermittent operation of only said second magnetic valve in a first range of negative value of said error signal corresponding in absolute magnitude to said first range of positive error signal value, and also for producing continuous operation of said first magnetic valve in a second range of positive value of said error signal and for producing continuous operation of said second magnetic valve in a second range of negative value of said error signal, said second ranges of error signal value comprising absolute magnitudes of error signal value higher than those of said first ranges of error signal value, and further comprising:

means including a variable pulse-width pulse generator and means for producing an actual increment signal representative of the absolute magnitude of displacement actually produced in response to a pulse of said generator, for automatically adjusting the ratio of operated to unoperated intervals of each of said magnetic valves during intermittent operation thereof as a function of the absolute magnitude of said error signal in a manner taking account of a predetermined base value ($T_o$) for the operated interval ($T_v$) of the valve being intermittently operated, by algebraically adding to said base value ($T_o$) at least one of first ($T_o$) and second ($T_s$) correction values, said first correction value, ($T_o$) being derived from subtractive comparison of said actual increment signal ($S_{act}$) with a corresponding increment ($S_{des}$) of desired displacement determined by said error signal, and said second correction value ($T_s$) being determined entirely by said error signal.

2. Control system according to claim 1, in which means are provided for computing both said first and second correction values ($\Delta T_o$, $T_s$) and adding them to a previously determined value of said base value ($T_o$) for each cycle of intermittent operation whenever one of said valves is being intermittently operated, in such a way that said second correction value ($T_s$) is algebraically added to said previously determined value of said base value ($T_o$) to produce a signal for control of said variable pulse-width generator and said first correction value ($\Delta T_o$) is algebraically added to said previously determined value of said base value ($T_o$) to produce a new value of said base value ($T_o$) which thereafter becomes the previously determined value of said base value ($T_o$) to which in the next cycle said second correction value ($T_s$) will be algebraically added.

3. Control system according to claim 1, in which said first ranges of respectively positive and negative error signal value are separated by a third range of error signal value lying between them, neither of the respective magnetic valves being operable when error signals are in said third range of value and in which system means are provided for producing hysteresis of the boundaries of said first ranges of error signal value.

4. Control system according to claim 3, in which time delay means are provided for delaying in time the transition between modes of operation of each of said valves, which modes are defined by the boundaries of said first ranges of error signal value, when a first hysteresis threshold is passed by said error signal.

* * * * *